(12) United States Patent
Ha et al.

(10) Patent No.: US 8,275,073 B2
(45) Date of Patent: Sep. 25, 2012

(54) METHODS AND SYSTEMS TO DISCRIMINATE BETWEEN PSK AND FSK SIGNALS

(75) Inventors: Stephen T. Ha, Greenville, TX (US); Michael L. Mahaffey, Austin, TX (US); Frank A. Boyle, Melissa, TX (US)

(73) Assignee: L—3 Communications Integrated Systems, L.P., Greenville, TX (US)

( * ) Notice: Subject to any disclaimer, the term of this patent is extended or adjusted under 35 U.S.C. 154(b) by 770 days.

(21) Appl. No.: 12/456,075

(22) Filed: Jun. 11, 2009

(65) Prior Publication Data
US 2010/0316168 A1    Dec. 16, 2010

(51) Int. Cl.
H03D 3/00 (2006.01)
H04L 27/10 (2006.01)
H04J 9/00 (2006.01)
H04L 5/04 (2006.01)

(52) U.S. Cl. ............ 375/323; 375/273; 370/204
(58) Field of Classification Search .......... 375/323
See application file for complete search history.

(56) References Cited

U.S. PATENT DOCUMENTS

| | | | | |
|---|---|---|---|---|
| 2004/0114629 | A1* | 6/2004 | Losiewicz et al. | 370/478 |
| 2007/0082647 | A1* | 4/2007 | Behzad et al. | 455/343.1 |
| 2007/0153947 | A1 | 7/2007 | Ha | 375/355 |
| 2008/0095290 | A1* | 4/2008 | Leung | 375/371 |
| 2008/0130604 | A1* | 6/2008 | Boyd | 370/338 |
| 2009/0003422 | A1 | 1/2009 | Ha | 375/225 |
| 2009/0006516 | A1* | 1/2009 | Ha | 708/404 |

OTHER PUBLICATIONS

Averbuch et al, "*Fast Slant Stack: A Notion of Radon Transform for Data in a Cartesian Grid Which is Rapidly Computible, Algebraically Exact, Geometrically Faithful and Invertible*," 2001; 40 pgs.
Adaptive Research Notes, "*Investigating Adaptations to Climate Change by Natural Resource Dependent Societies in Southern Africa: A Framework for Investigating Climate Change*," Note 2, Nov. 2003, 3 pgs.
Tatham, "*Multidimensional Filtering of Seismic Data*," Proceedings of the IEEE, vol. 72, No. 10, Oct. 1984, 19 pgs.
van Ginkel et al., "*A Short Introduction to the Random and Hough Transforms and How They Relate to Each Other*," Quantitative Imaging Group Technical Report Series, No. QI-2004-01, Feb. 2004, 11 pgs.
Pace, "*Detecting and Classifying Low Probability of Intercept Radar*," Chapter 11, 2004, 35 pgs.

(Continued)

*Primary Examiner* — David C. Payne
*Assistant Examiner* — Erin File
(74) *Attorney, Agent, or Firm* — O'Keefe, Egan, Peterman & Enders LLP (57) ABSTRACT

Methods and systems are disclosed herein for discriminating phase-shift-key (PSK) modulated signals from frequency-shift-key (FSK) modulated signals in received signal streams. First, a bit frequency analysis is applied to a digital signal stream representing the received signal stream. The bit frequency analysis computes bit frequencies for bit segments within the digital signal stream. These bit frequencies are then summed in an array to form a bit frequency histogram. Second, a bit phase analysis is applied to the digital signal stream. The bit phase analysis computes bit phases for bit segments within the digital signal stream. These bit phases are then summed in an array to form a bit phase histogram. Spikes within the bit frequency and bit phase histograms can be used to determine whether the received signal stream includes FSK or PSK signals. An enhanced bit phase analysis can also used, if needed.

20 Claims, 6 Drawing Sheets

OTHER PUBLICATIONS

Pace, "*Detecting and Classifying Low Probability of Intercept Radar*," 2004, 14 pgs.

"*Image Projections and the Radon Transform*," printed from Internet Jun. 22, 2007, 14 pgs.

Liley, "The Radon Transform", Mar. 1998, 2 pgs.

Ziemer, R.E. et al., "*Noise in Modulation Systems*," Principles of Communications-Systems, Modulation and Noise, 1990, pp. 450-497.

* cited by examiner

METHODS AND SYSTEMS TO DISCRIMINATE BETWEEN PSK AND FSK SIGNALS

TECHNICAL FIELD OF THE INVENTION

The present disclosure relates to systems that use PSK (phase-shift-keying) and FSK (frequency-shift-keying) modulation techniques. More particular, the present disclosure relates to detecting and distinguishing PSK modulated signals from FSK modulated signals.

BACKGROUND

Signals are often processed to identify the nature of the received signal and/or to extract certain events from received signals. For example, with respect to electronic intelligence (ELINT) applications, whether or not a repetitive signal is being received and the nature of this repetitive signal must be determined because the source is typically an unknown signal source that is being detected by the ELINT system. Extraction of signals from raw signal data can require that the events and modulation techniques be detected within the raw signal data. Examples of modulation techniques that may be present in received signals include repetitive synchronized events such as phase transitions in a phase-shift key (PSK) signal and frequency transitions in a frequency-shift key (FSK) signal.

The detection of unknown signals and signal patterns are particularly difficult in low signal-to-noise ratio (SNR) environments are encountered. For example, it becomes difficult to distinguish PSK signals from FSK signals (and vice versa) when noisy signal data is being received. One prior solution has attempted to overcome these low SNR problems by recovering data bits using a match filter or correlation approach. The purpose of this approach is to derive, in relation to the SNR, the error probability in bit recovery. This approach, however, assumes that the system has knowledge of the start time, minimum interval, and the PSK carrier frequency and phases for PSK signals or FSK frequencies for FSK signals. As such, significant information concerning the signals being received must be known prior to reception.

SUMMARY OF THE INVENTION

Methods and systems are disclosed herein for discriminating phase-shift-key (PSK) modulated signals from frequency-shift-key (FSK) modulated signals in received signal streams. First, a bit frequency analysis is applied to a digital signal stream representing a signal stream received by the system. The bit frequency analysis operates to compute the bit frequency for a plurality of bit segments within the digital signal stream, for example, using a Fourier transform analysis. These bit frequencies are then summed in an array to form a bit frequency histogram. Spikes within this bit frequency histogram can be used to determine whether the received signal stream includes FSK or PSK signals. Second, a bit phase analysis is applied to the digital signal stream. The bit phase analysis operates to compute the bit phase of a plurality of bit segments within the digital signal stream. These bit phases are then summed in an array to form a bit phase histogram. Spikes within this bit phase histogram can be used to determine whether the received signal stream includes FSK or PSK signals. An enhanced bit phase analysis can also be conducted on the digital signal stream if needed. As further described below, other features and variations can be implemented and related methods and systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Methods and systems are disclosed herein for discriminating phase-shift-key (PSK) modulated signals from frequency-shift-key (FSK) modulated signals in received signal streams. First, a bit frequency analysis is applied to a digital signal stream representing a signal stream received by the system. The bit frequency analysis operates to compute the bit frequency for a plurality of bit segments within the digital signal stream, for example, using a Fourier transform analysis. These bit frequencies are then summed in an array to form a bit frequency histogram. Spikes within this bit frequency histogram can be used to determine whether the received signal stream includes FSK or PSK signals. For PSK signals, only one well defined spike is obtained in the bit frequency histogram. For FSK signals, more than one spike will be obtained in the bit frequency histogram. Second, a bit phase analysis is applied to the digital signal stream. The bit phase analysis operates to compute the bit phase of a plurality of bit segments within the digital signal stream. These bit phases are then summed in an array to form a bit phase histogram. Spikes within this bit phase histogram can be used to determine whether the received signal stream includes FSK or PSK signals. For PSK signals, multiple well defined spikes will be obtained in the bit phase histogram corresponding to the frequency used in the PSK modulation. For FSK signals, no well defined spikes will be obtained in the bit phase histogram. If desired, an enhanced bit phase analysis can also be conducted on the digital signal stream, if needed. As further described below, other features and variations can be implemented and related methods and systems can be utilized, as well.

The methods and systems described herein using bit frequency and bit phase analyses to make PSK/FSK determinations provide a number of advantages. For example, the results of each bit segment are re-enforced to provide an improvement to the SNR of $\sqrt{n}$, where n is the number of frequency transitions in the bit frequency computation or the number of phase transitions in the bit phase computation. Further, the bit phase computation is able to recover the phase shifts of PSK signals at very low SNR due to the √n improvement. The bit frequency computation is also able to recover the frequencies of the FSK signals at very low SNR due to the √n improvement. Still further, the repetition interval computation using the Fourier transform can be used to overcome the inaccuracy in the estimated carrier frequency to recover the phase of a PSK signal. And this repetition interval method followed by the Radon transform method of US Published Patent Application No. 2009-0003422 allows for non-standard phase states (i.e., not sub-multiples of 360 degrees) of PSK signals to be revealed. For example, a PSK signal may have phase states of 47 and 124 degrees, which deviate from the usual sub-multiple of 360 degrees. However, because they also repeat every 360 degrees, the Radon transform technique is able to reveal the pattern. Although these advantages are set forth, other advantages may also be provided by the methods and systems described herein using bit frequency and bit phase analyses to make PSK/FSK determinations.

Figures 1A, 1B:
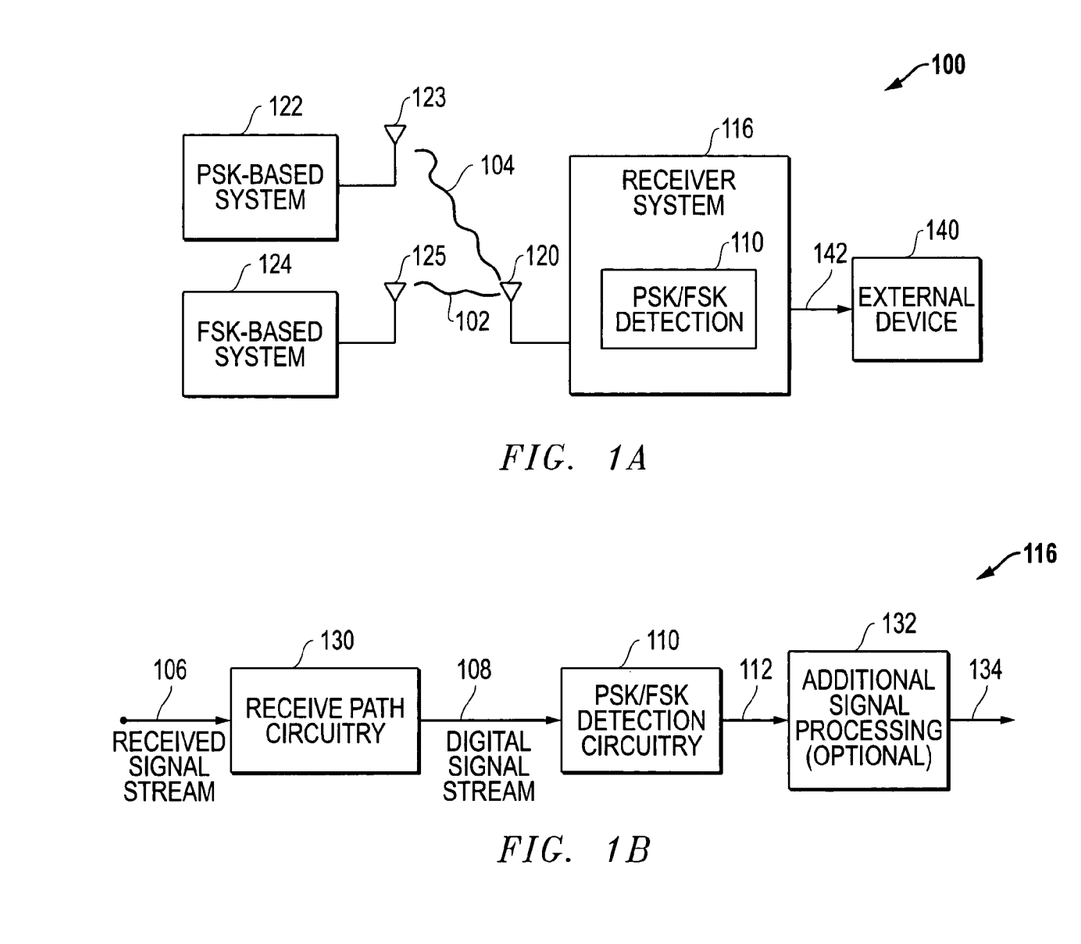
FIG. 1A is a block diagram of an environment including a receiver system having detection circuitry for determining whether phase-shift-key (PSK) signals or frequency-shift-key (FSK) signals are included with received signals.
FIG. 1B is a block diagram for a receiver system having PSK/FSK detection circuitry.

FIG. 1 is a block diagram for an environment 100 including a receiver system 116 having detection circuitry 110 for determining whether phase-shift-key (PSK) signals and/or frequency-shift-key (FSK) signals are included within a received signals stream. In the embodiment depicted, a PSK system 122 is transmitting PSK modulated signals 104 from an antenna 123. And these PSK modulated signals 104 are received by antenna 120 for the receiver system 116. In addition, an FSK system 124 is transmitting FSK modulated signals 102 through an antenna 125. And these FSK modulated signals 102 are also received by antenna 120 for the receiver system 116. As such, the signals that are received by the receiver system 116 can include a variety of signal types including FSK signals and PSK signals.

As described further below, the receiver system 116 includes PSK/FSK detection circuitry 110 that processes received signals in order to determine if PSK signals and/or FSK signals are being received. The receiver system 116 can internally utilize the results of this PSK/FSK determination and/or can provide information representing this PSK/FSK determination to an external device 140 through communication path 142. The external device 140 can be a wide variety of devices or systems, including a display system, a host processor, and/or any other desired device or system that is configured to utilize the PSK/FSK related information output by the receiver system 116. For example, the PSK/FSK related histograms discussed below could be output visually on a display system, if desired.

It is noted that signals of interest received by the receiver system 116 may be received simultaneously with other signals that are not of interest to the receiver system 116. These signals not of interest in effect amount to noise energy that potentially interferes with the identification of signals of interest within the received signal stream. It is further noted that the systems and methods described herein for PSK/FSK detection are particularly useful for environments where the signal-to-noise ratio (SNR) is relatively low.

FIG. 1B is a block diagram for a receiver system 116 having PSK/FSK detection circuitry 110. In the embodiment depicted, receive path circuitry 130 receives incoming received signal stream 106 that is received, for example from antenna 120 in FIG. 1A. The receive path circuitry 130 then processes this received signal stream 106 and outputs a digital signal stream 108 representing these received signals. The PSK/FSK detection circuitry 110 then receives this digital signals stream 108 and processes the digital signal stream 108, as described below, to determine whether PSK signals and/or FSK signals are being received by the receiver system 116. Once the PSK/FSK detection and determination has been made, the PSK/FSK detection circuitry 110 provides output signals 112 that represent the PSK/FSK determinations made concerning the received signal stream 106. These PSK/FSK determination output signals 112 can then be optionally further processed using additional signal processing circuitry 132 within the receiver circuitry 116. This additional signal processing circuitry 132 can further provide output signals 134. It is noted that output signals 112 and/or output signals 134 can be provided to a external device 140, as indicated above.

It is understood that the receive path circuitry 130 can be implemented using any desired receiver architecture, such as direct conversion, heterodyne, super-heterodyne, low-IF and/or other receive path circuit topologies that receive an analog signal stream and output a digital signal stream representing the received analog signal stream. It is further noted that the PSK/FSK detection circuitry 110, as well as the optional additional signal processing circuitry 132, can be implemented using any desired digital signal processing (DSP) embodiment, such as DSP circuitry implemented using firmware or software or a combination thereof. It is further noted that the receiver system 116, as depicted in FIG. 1A, is shown as processing RF signals; however, other embodiments could be implemented using the techniques described herein to receive and/or process other types of signals. For example, the received signal stream 106 may represent acoustic signals, sonar signals, seismic signals, radar signals, optical signals and/or other signal types.

In operation, the PSK/FSK detection circuitry 110 detects and discriminates between PSK and FSK signals and can also be used to recover PSK phases and FSK frequencies in the digital signal stream 108. In particular, the PSK/FSK detection circuitry 110 is configured to apply (1) a bit frequency analysis and/or (2) a bit phase analysis to discriminate between PSK signals and FSK signals in the digital signal stream 108. As described further below, the bit frequency analysis algorithm first operates to compute the bit frequency for a plurality of bit segments within the digital signal stream 108. Second, the bit phase analysis algorithm operates to compute the bit phase for a plurality of bit segment within the digital signal stream 108. Using the results of the bit frequency analysis and the bit phase analysis, a determination can be made by the PSK/FSK detection circuitry 134 whether or not a PSK signal and/or an FSK signal has been received. As described further below, if a determination still cannot be made, a further enhanced bit phase analysis can be conducted to facilitate this determination.

It is noted that a bit segment represents each portion of the received signal stream that represents a single logical state (such as logical "1" or "0" in BPSK, or "00", "01", "11", "10" in QPSK) in the received signal stream. By processing these bit segments, the receiver system 116 can determine which state that bit segment represents. To determine the location of bit segments within the received signal stream, the receiver system 130 can be configured to determine the minimum interval (T) and the time instances {t0, t0+T, t0+2T, ..., t0+nT, ...} where PSK phase transitions (or FSK frequency transitions) are likely to occur. It is noted that "t0" represents the time offset from the beginning of the PSK (or FSK) time series where the first phase (or frequency) transition occurs. "t0" and "T" can be obtained by methods described in US co-pending U.S. patent application Ser. No. 11/823,472 entitled "Methods and Systems for Detecting Repetitive Synchronized Signal Events" and published as US Published Patent Application No. 2009-0003422, which is hereby incorporated by reference in its entirety.

The bit frequency analysis can be implemented by performing a Fourier transform of bit segments within the digital signal stream. The maximum frequency ($f_{max}$) at the energy peak within the bit segment is obtained using this Fourier transform analysis as it is applied to each bit segment. This peak value is then added to an initially empty array at the index that equals the maximum frequency ($f_{max}$) for that bit segment. After the results of all bit segments are summed, this array becomes a bit frequency histogram of the peak values of the energy spectrum for the bit segments within the digital signal stream. The bit frequency histogram will exhibit spikes corresponding to the frequency indices ($f_{max}$) where repetitive frequencies have used by a transmitting system, such as PSK-based system 122 and/or FSK-based system 124 in FIG. 1A. For example, for an FSK modulated signal using two transmission frequencies, the bit frequency histogram will exhibit two spikes corresponding to the frequency indices ($f_{max}$) for those two frequencies. In contrast, for a PSK modulated signal, the bit frequency histogram will exhibit only one spike corresponding to the carrier frequency for the PSK modulation. It is noted that the bit frequency analysis can also be performed using other implementations, if desired.

The bit phase analysis can be implemented by estimating a carrier frequency and then correlating time shifts with respect to this carrier frequency for the bit segments in the digital signal stream. The bit frequency analysis above can be used to obtain an estimate for the carrier frequency. In other words, frequency spikes would be expected in the bit frequency histogram for the carrier frequency being used by a transmitting system. It is noted, however, that other methods for estimating the carrier frequency could also be used, if desired. Once the carrier frequency is estimated, each bit segment is then correlated with a pilot carrier wave representing this carrier frequency, and the phase shift (or time shift) with respect to the pilot carrier wave is obtained for each bit segment. The maximum correlation value is added to an array at an index equal to the phase shift that gives the maximum correlation value. This array that contains the sum of all bit segment results is the bit phase histogram. Alternatively, the phase shift of a bit segment may be obtained from the phase of the carrier frequency in the bit segment Fourier transform. The value to be added to the array is the spectral amplitude of the carrier frequency. The bit phase histogram will exhibit spikes corresponding to repetitive phases being used by a transmitting system, such as PSK-based system 122 and/or FSK-based system 124 in FIG. 1A. For example, if the received signal is a PSK signal, the bit phase histogram will show a spike for each phase shift that is being used by the transmitting system. As such, if the received signal were to use binary PSK (BPSK) modulation, two well defined spikes will be exhibited on the bit phase histogram representing the two phases utilized for the BPSK modulation. In contrast, if the received signal is an FSK signal, the spikes in the histogram will not be well defined. It is noted that the bit phase analysis can also be performed using other implementations, if desired.

For the bit phase analysis, if the carrier frequency cannot be estimated accurately, an enhanced phase analysis can be utilized to overcome this discrepancy. This enhanced phase analysis can be implemented by unwrapping the computed bit phase by applying a Fourier transform to the phase array to obtain the most common minimum interval between the phases so as to arrive at a prevalent repetition interval (PRI). The PRI can then be used to enhance the bit phase analysis processing of the digital signal stream. It is also noted that this enhanced phase analysis method can also be applicable to the detection of PSK phases that may not be sub-multiples of 360 degrees.

Advantageously, using the bit frequency and bit phase algorithms described herein, although correlation is used in PSK phase recovery, no prior knowledge is required for the start time, minimum interval, PSK carrier frequency, PSK phases and/or FSK frequencies. The bit frequency analysis results in histograms providing high SNR spikes easily applied to make FSK and PSK distinctions, and the bit phase analysis results in histograms providing high SNR spikes also easily applied to make FSK and PSK distinctions. Moreover, the enhanced phase analysis can be used to overcome inaccuracies in the estimated carrier frequency and to recover the phases of a PSK signal. This enhanced method, when followed by a Radon transform method, is also able to reveal non-standard phase states (i.e., not sub-multiples of 360 degrees) of a PSK signal. An example Radon transform method is described in co-pending U.S. patent application Ser. No. 11/823,472 entitled "Methods and Systems for Detecting Repetitive Synchronized Signal Events" and published as US Published Patent Application No. 2009-0003422, which is hereby incorporated by reference in its entirety.

Figure 2:
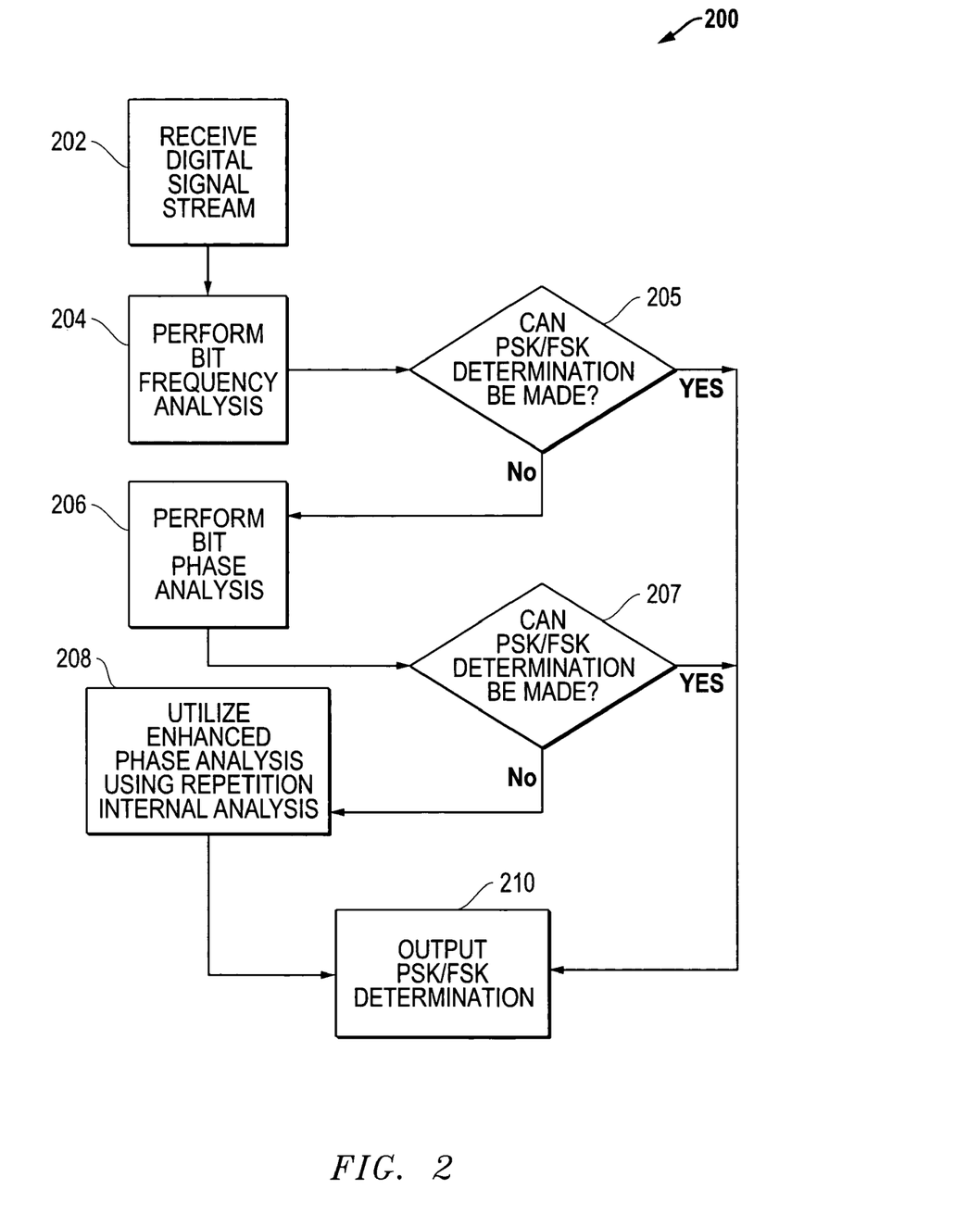
FIG. 2 is a flow diagram for an example embodiment for detection analyses conducted by the PSK/FSK detection circuitry including a bit frequency analysis and a bit phase analysis.

FIG. 2 is a flow diagram for an example embodiment 200 for detection analyses conducted by the PSK/FSK detection circuitry including a bit frequency analysis and a bit phase analysis. In block 202, the digital signal stream is first received, and bit segment information relating to start and end times for the bit segments in a dwell can also be received. Processing is then performed on each bit segment using algorithms in blocks 204, 206 and/or 208. First, in block 204, the bit frequency analysis is performed, for example, using a Fourier transform. Flow then passes to decision block 205 where a decision is made whether the received signal can be determined to be an FSK or a PSK signal. If "YES," then flow passes to block 210 wherein the PSK/FSK determination is output. If "NO," then flow passes to block 206 where the bit phase analysis is performed. Flow then passes to decision block 207 where a decision is again made whether the received signal can be determined to be an FSK or a PSK signal. If "YES," then flow passes to block 210 wherein the PSK/FSK determination is output. If "NO," then flow passes to block 208 where the enhanced bit phase analysis is performed. In block 208, if the received signal stream includes an FSK signal with spikes that are not well defined due to difficulty estimating the carrier frequency, then block 208 improves the phase computation by unwrapping the computed bit phase using repetitive interval analysis. Flow then passes to block 210 where the PSK/FSK determination is output.

It is noted that even if all three algorithms in blocks 204, 206 and 208 are utilized, a determination may still not be possible as to whether a PSK and/or FSK signal has been received. It is further noted that, if desired, the bit phase analysis in block 206 can still be utilized even though the bit frequency analysis in block 204 was able to make a PSK/FSK determination. Similarly, if desired, the enhanced bit phase analysis in block 208 can still be utilized even though the bit phase analysis in block 204 was able to make a PSK/FSK determination. Further signal processing can also be performed, as desired.

Figure 3:
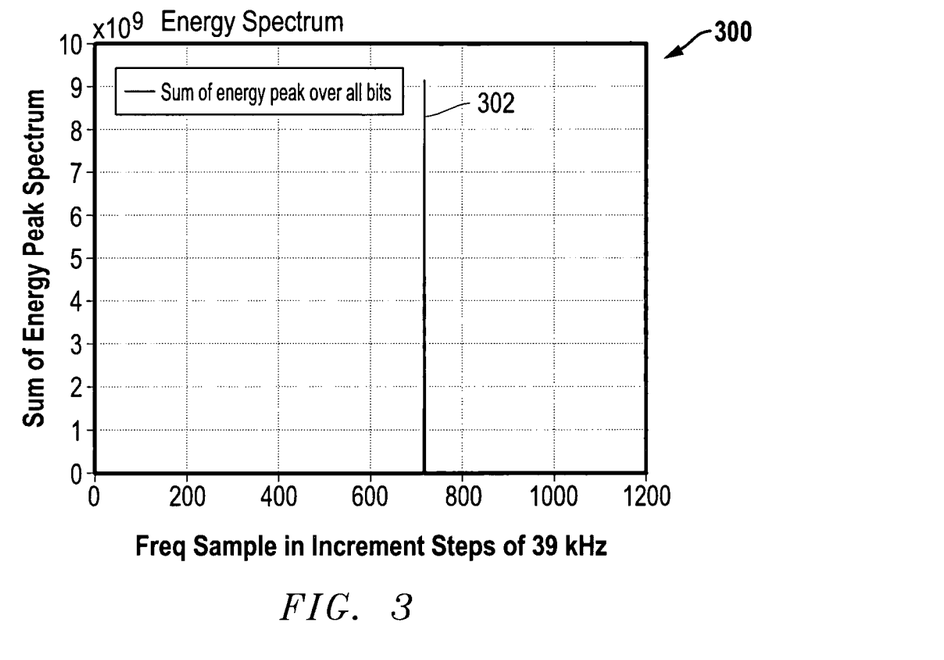
FIG. 3 is a bit frequency histogram for a PSK signal.
Figure 4:
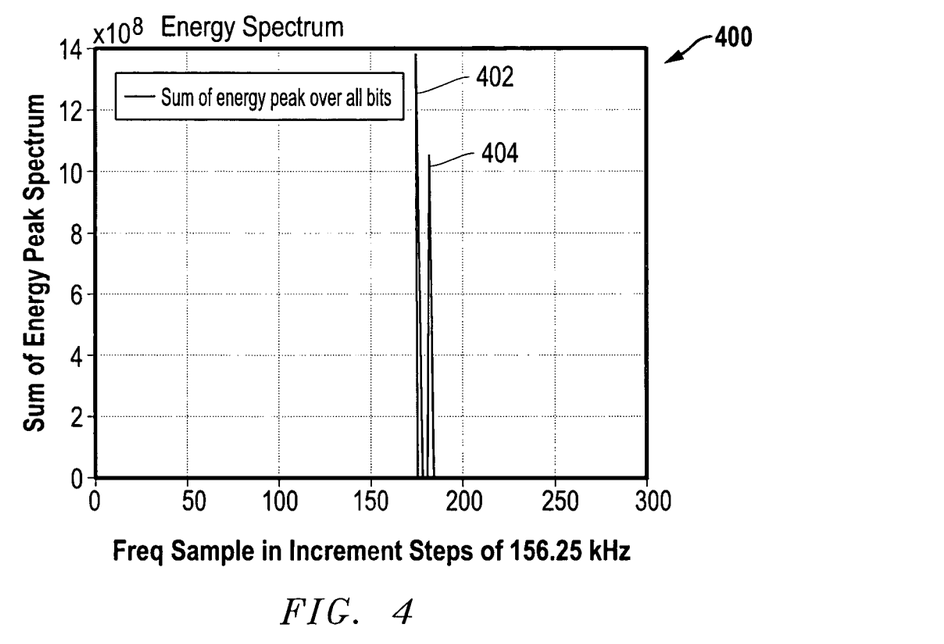
FIG. 4 is a bit frequency histogram for a FSK signal.
Figure 5:
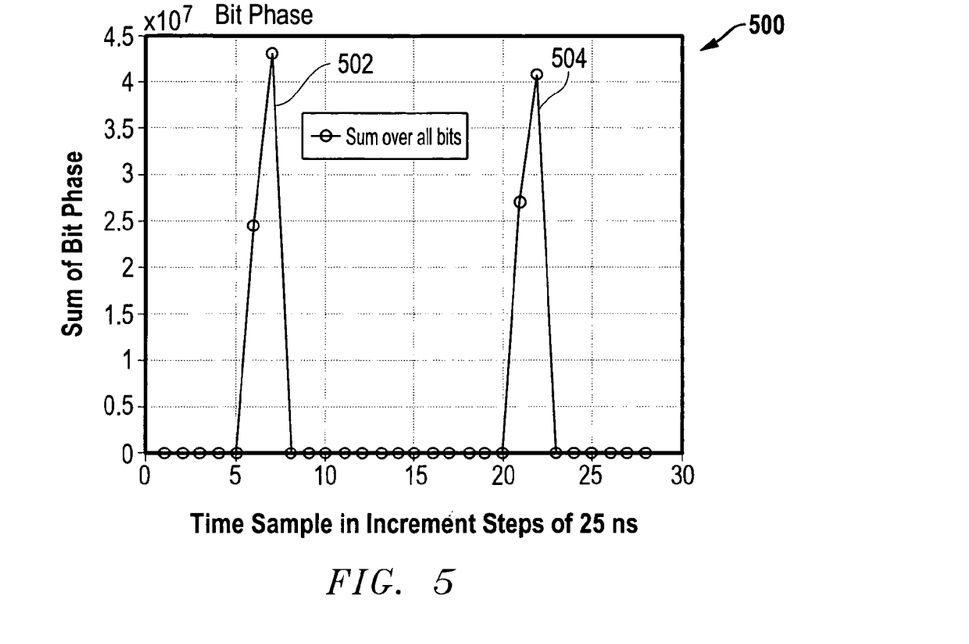
FIG. 5 is a bit phase histogram for a binary PSK signal.
Figure 6:
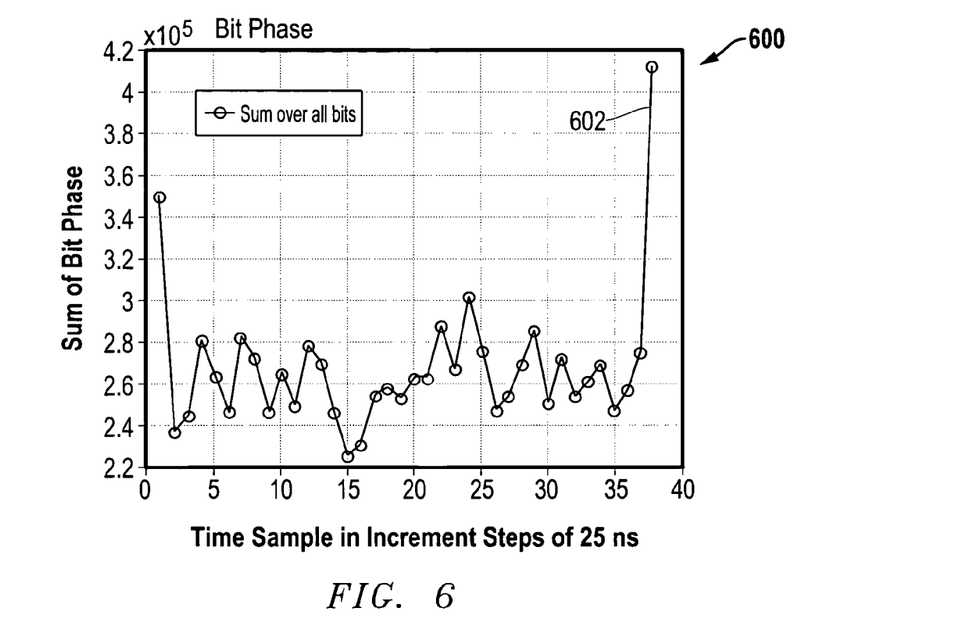
FIG. 6 is a bit phase histogram for a FSK signal.
Figure 7:
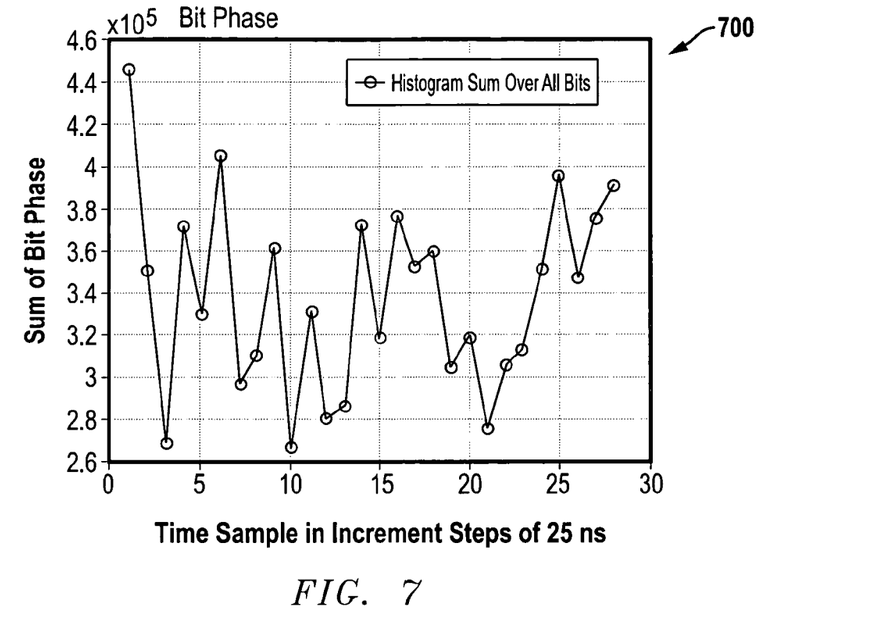
FIG. 7 is a histogram illustrating the effect of an error in carrier frequency estimation.
Figure 8:
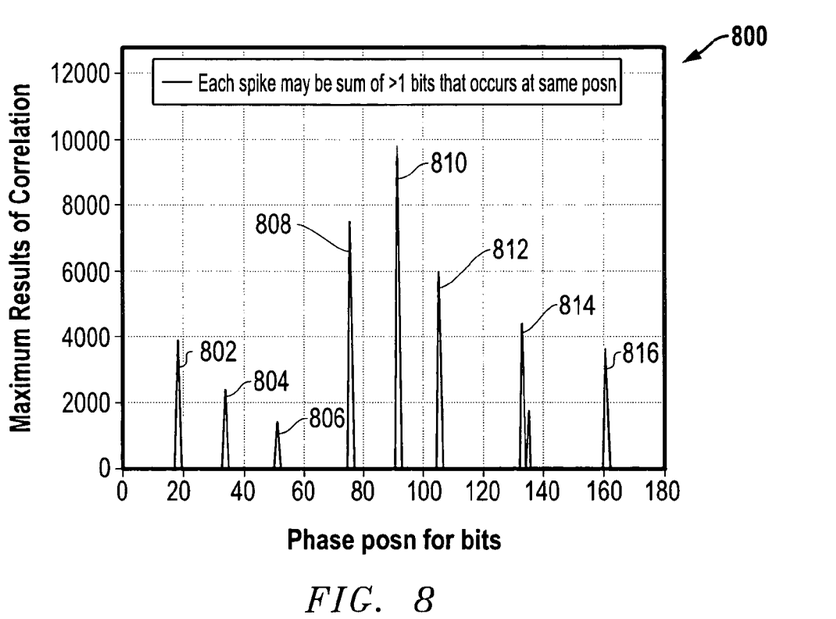
FIG. 8 is a phase array diagram for the PSK signal of FIG. 7 where an error occurs in the carrier frequency estimation.
Figure 9:
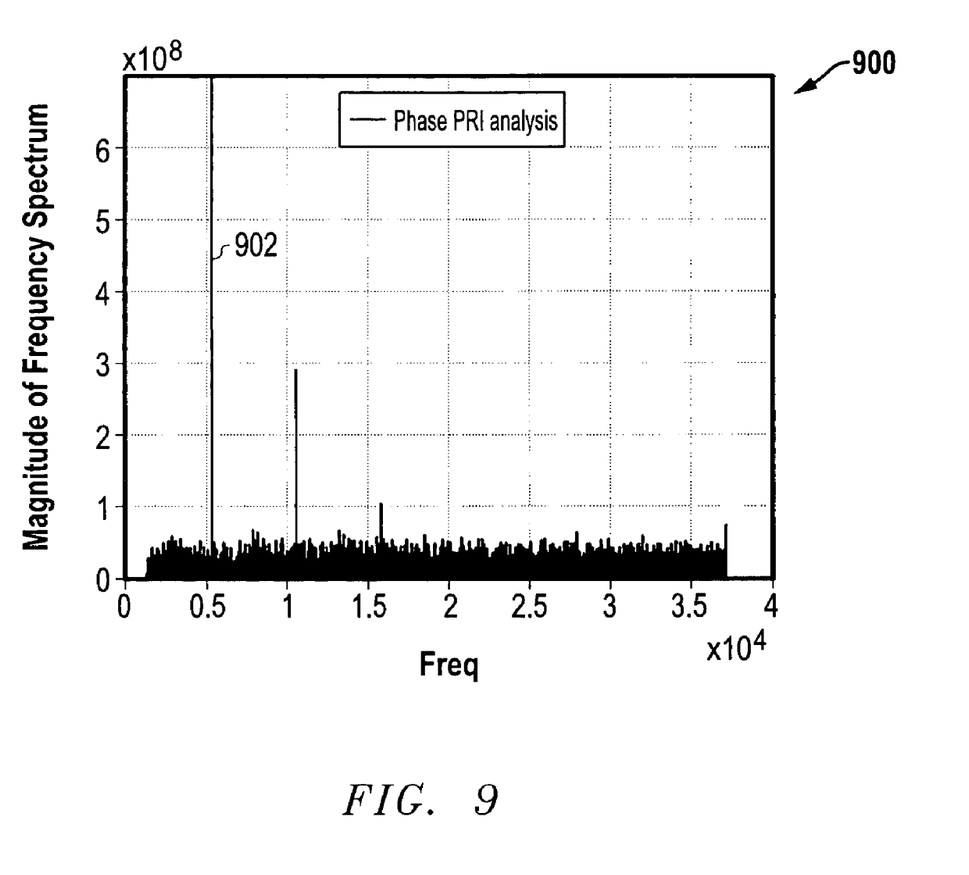
FIG. 9 is a histogram for a Fourier transform of the phase array in FIG. 8.

Example histograms and processing results are now described with respect to FIGS. 3-9 for the bit frequency analysis and bit phase analysis described above. FIGS. 3 and 4 represent bit frequency histograms resulting from a bit frequency analysis applied to a PSK signal and an FSK signal, respectively. FIGS. 5 and 6 represent bit phase histograms resulting from a bit phase analysis applied to a PSK signal and an FSK signal, respectively. FIGS. 7-9 relate to an application of the enhanced phase analysis.

FIG. 3 is an example bit frequency histogram 300 for a PSK signal. The horizontal axis represents the frequency of the sample in increment steps of 39 kHz. The vertical axis represents the sum of energy peak spectrum. As such, the vertical axis provides the summed energy spectrum level for the maximum frequency peaks for the bit segments. As discussed above, the peak value for each bit segment is added to an initially empty array at the index that equals the frequency for the peak value. For a PSK signal, the histogram will typically exhibit only one spike corresponding to the carrier frequency used for the PSK signals. As such, only one spike in a bit frequency histogram is indicative of a PSK signal. Multiple spikes in the bit frequency histogram is indicative of non-PSK signals. The histogram 300 is an example for a resulting array of peak values for the energy spectrum of the bit segments. The single spike 302 in the histogram 300 strongly indicates that the received signal is a PSK signal. It is noted that a signal to noise ratio (SNR) of about −5 db was used for this example; however, the SNR characteristics of the spike would still be quite high even if a much lower SNR were used for the input signal.

FIG. 4 is an example bit frequency histogram 400 for a FSK signal. The vertical axis is still representing the sum of the energy peak spectrum, and the horizontal axis represents the frequency of the sample in increment steps of 156.25 kHz. As above, the peak value for each bit segment is added to an initially empty array at the index that equals the frequency index. Generally, more than one spike in a bit frequency histogram is indicative of a FSK signal, and the number of spikes in the resulting histogram corresponds to the number of frequencies used in the FSK modulation. The histogram 400 is an example for a resulting array of peak values for the energy spectrum of the bit segments. As depicted, the histogram 400 exhibits two separate spikes 402 and 404 that strongly indicate that the received signal is an FSK signal. And the two spikes 402 and 404 correspond to frequency indices used for the FSK signal. It is noted that a signal to noise ratio (SNR) of about −5 db was used for this example; however, the SNR characteristics of the spikes would still be quite high even if a much lower SNR were used for the input signal.

FIG. 5 is an example bit phase histogram 500 for a binary PSK (BPSK) signal. The horizontal axis represents time (in increment steps of 25 ns) or phase of the sample. The vertical axis represents the sum of the maximum correlation values at the bit phases for each bit segment. As described above, the bit phase analysis is obtained by first estimating a carrier frequency and then by correlating each bit segment with a pilot carrier wave relating to the carrier frequency to obtain the phase shift modulo $2\pi$ (or time shift modulo $\tau$, where $\tau$ is the period of the carrier frequency) with respect to the pilot carrier wave for each bit segment. The phase shift of all the bit segments are summed into a histogram. If the signal is a PSK signal, the histogram will display a spike for each phase shift. In the case of a BPSK signal, two well defined spikes will be exhibited. The histogram 500 is an example for a resulting array of the time (or phase) values for the bit segments. Histogram 500 clearly shows two well defined spikes 502 and 504 corresponding to each phase used for the BPSK modulation. It is noted that a signal to noise ratio (SNR) of about −5 db was used for this example; however, the SNR characteristics of the spikes would still be quite high even if a much lower SNR were used for the input signal.

FIG. 6 is an example bit phase histogram 600 for an FSK signal. The horizontal axis still represents time (in increment steps of 25 ns) or phase of the sample, and the vertical axis still represents the sum of the maximum correlation values at the bit phases for each bit segment. If the signal is an FSK signal, the spikes will not be well defined in the bit phase histogram. The histogram 600 is an example for a resulting array of the time (or phase) values for the bit segments. In histogram 600, the resulting summation line 602 does not provide a clearly defined spike. This lack of a defined spike is clearly indicative that this signal is not a PSK signal. It is noted that a signal to noise ratio (SNR) of about −5 db was also used for this example.

As indicated above, there are times when a the bit phase analysis is being conducted but the carrier frequency cannot be estimated accurately. As such, the bit phase histogram of summed phases for the bit segments may not work well because the error in estimating the carrier frequency may lead to progressively larger errors for bits further away from the start time. As such, the inaccurate carrier frequency causes the histogram of phases to lose synchronization and may depict unreasonable or unexpected results for a PSK signal.

FIG. 7 depicts an example histogram 700 where the carrier frequency was not accurately estimated. An initial error in the carrier frequency transposes to progressively larger errors for the bits further away from the start time. In FIG. 7, histogram 700 depicts an initial error from the actual digital carrier frequency, which causes the histogram of phases to lose synchronization, and illustrates unexpected results for the PSK signal. In other words, unlike histogram 500 of FIG. 5 where two distinct phase peaks 502 and 504 are obtained for a BPSK signal, histogram 700 does not result in any distinct phase peaks, but includes a result more similar to the FSK bit phase histogram 600 of FIG. 6. As in FIGS. 5 and 6, the horizontal axis in FIG. 7 still represents time (in increment steps of 25 ns) or phase of the sample, and the vertical axis still represents the sum of the bit phases for each bit segment.

As described above, the enhanced bit phase analysis can compensate for the discrepancy in carrier frequency estimation. This enhanced bit phase analysis can begin by unwrapping the phases computed for each bit segment. For example, the phases that are computed for bits further away from the start time are assigned to values greater than or equal to phases computed for bits that are nearer to the start time. These phases are then placed in an array (P) where the index into the array represents the rounded and amplified phase values of the bits. The value of the array element corresponds to the maximum correlation results of the corresponding bit with respect to the pilot carrier wave. An example for such an array (P) is depicted in FIG. 8. This array (P) is then subjected to a Fourier transform in order to determine the most prevalent repetition interval (PRI), which can be assumed to be the most common minimum interval between phases. An example for this PRI analysis is shown in FIG. 9. The PRI is then used to determine the appropriate estimation for the PSK phases.

FIG. 8 represents a phase array 800 for the PSK signal of FIG. 7 where an error has occurred in the estimation of the carrier frequency. The horizontal axis depicts the "unwrapped" phase value of the corresponding bit. The vertical axis depicts the value of maximum correlation of a bit with the pilot carrier wave. Each spike 802, 804, 806, 808, 810, 812, 814 or 816 represents a bit or several consecutive bits if their phases are equal. As such, these spikes may be the sum of multiple bits (>1) that occur at the same phase position (posn). If several consecutive bits within the same phase occur, then their maximum results of correlation are summed into an element. Spikes further away from the phase zero represent bits that occur further away from the start time. The "unwrapped" phase may be amplified (or scaled higher several times) before rounding up to an integer to produce sufficient resolution.

FIG. 9 represents a Fourier transform 900 of the phase array (P) of FIG. 8. The vertical axis represents the magnitude of the frequency spectrum as a result of the PRI phase analysis, and the horizontal axis represents frequency. Once the Fourier transform is obtained for the phase array (P), the maximum frequency in the resulting Fourier transform gives the most prevalent repetition interval between the spikes. For FIG. 9, the Fourier transform 900 depicts that the maximum frequency ($f_{max}$) occurs at spike 902 and translates to a phase value of 3.09 radians. In other words, the maximum frequency indicates that the phase array (P) contains a pulse train that repeats at an interval of 3.09 radians. If one assumes that the phase values are a sub-multiple of 360 degrees (or $2\pi$ radians), then the phase value from FIG. 9 falls into the bin that belongs to $\pi$=3.147 radians.

The methods and systems described herein using bit frequency and bit phase analyses to make PSK/FSK determinations provide a number of advantages. For example, the results of each bit segment are re-enforced to provide an improvement to the SNR of $\sqrt{n}$, where n is the number of frequency transitions in the bit frequency computation or the number of phase transitions in the bit phase computation. Also, the bit frequency computation produces a clear-cut discrimination between FSK and PSK signals. For PSK, only one well defined spike is obtained in the histogram. For FSK signals, more than one spike will be obtained. Further, the bit phase computation is able to recover the phase shifts of PSK signals at very low SNR due to the $\sqrt{n}$ improvement. The bit frequency computation is also able to recover the frequencies of the FSK signals at very low SNR due to the $\sqrt{n}$ improvement. Still further, the repetition interval computation using the Fourier transform can be used to overcome the inaccuracy in the estimated carrier frequency to recover the phases of a PSK signal. And this repetition interval method followed by the Radon transform method of US Published Patent Application No. 2009-0003422 allows for non-standard phase states (i.e., not sub-multiples of 360 degrees) of PSK signals to be revealed. For example, a PSK signal may have phase states of 47 and 124 degrees, which deviate from the usual sub-multiple of 360 degrees. However, because they also repeat every 360 degrees, the Radon transform technique is able to reveal the pattern. Although these advantages are set forth, other advantages may also be provided by the methods and systems described herein using bit frequency and bit phase analyses to make PSK/FSK determinations.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for discriminating between phase-shift-key (PSK) modulation and frequency-shift-key (FSK) modulation in a received signal stream, comprising:
   receiving an analog signal stream with receive path circuitry;
   converting the analog signal stream to a digital signal stream;
   analyzing bit frequency for a plurality of bit segments within the digital signal stream to determine for a each bit segment a frequency ($f_{max}$) at which a maximum signal energy occurs within the bit segment;
   combining the maximum frequencies ($f_{max}$) to generate a bit frequency histogram for the bit frequency of the plurality of bit segments;
   determining that the digital signal stream includes PSK modulated signals if a number of frequency spikes in the bit frequency histogram is one, that the digital signal stream includes FSK modulated signals if a number of frequency spikes in the bit frequency histogram is greater than one, and that a PSK/FSK determination cannot be made if a number of frequency spikes is not determinable; and
   outputting PSK/FSK determination signals representing the results of the determining step.

2. The method of claim 1, wherein the analyzing step comprises applying a Fourier transform to each bit segment to determine the frequency ($f_{max}$) at which the maximum signal energy occurs within the bit segment.

3. The method of claim 2, wherein the combining step comprises starting with an empty array and adding a peak value to the array at an index equal to the maximum frequency ($f_{max}$) for each bit segment to form the bit frequency histogram.

4. The method of claim 1, further comprising:
   estimating a carrier frequency;
   analyzing a bit phase for a plurality of bit segments within the digital signal stream to determine for a each bit segment a phase shift relative to the estimated carrier frequency;
   combining the phase shifts to generate a bit phase histogram for the bit phase of the plurality of bit segments;
   determining that the digital signal stream includes FSK modulated signals if no phase spikes occur in the bit phase histogram, that the digital signal stream includes PSK modulated signals if a phase spikes occur in the bit phase histogram, and that a PSK/FSK determination cannot be made if a number of phase spikes is not determinable;
   generating PSK/FSK determination signals representing the results of the bit phase determining step; and
   outputting the PSK/FSK determination signals relating to the bit phase determining step.

5. The method of claim 4, wherein the estimating step comprises using a frequency spike from the bit frequency histogram as an estimated carrier frequency.

6. The method of claim 4, wherein if the carrier frequency cannot be accurately estimated, the method further comprises:
   unwrapping the bit phase to generate a bit phase array representing bit phase correlation values;
   applying a Fourier transform to the bit phase array;
   utilizing a most common minimum interval between bit phase correlation values in the Fourier transform as a prevalent repetition interval; and
   using the prevalent repetition interval to determine an appropriate estimation for the PSK phases.

7. The method of claim 6, further comprising further processing the signal stream using a Radon transform to determine if a PSK signal is using non-standard phase states.

8. The method of claim 1, wherein the receiving step comprises receiving the analog signal stream using an antenna.

9. The method of claim 8, wherein the analog signal stream includes signals generated from one or more radio frequency (RF) systems that are unknown signal sources.

10. The method of claim 9, wherein the one or more RF systems includes a PSK-based system or a FSK-based system.

11. A receiver system for discriminating between phase-shift-key (PSK) modulation and frequency-shift-key (FSK) modulation in a received signal stream, comprising:
receive path circuitry configured to receive an analog signal stream and to output a digital signal stream;
detection circuitry configured to analyze bit frequency for a plurality of bit segments within the digital signal stream to determine for a each bit segment a frequency ($f_{max}$) at which a maximum signal energy occurs within the bit segment and to combine the maximum frequencies ($f_{max}$) to generate a bit frequency histogram for the bit frequency of the plurality of bit segments;
wherein the detection circuitry is further configured to determine that the digital signal stream includes PSK modulated signals if a number of frequency spikes in the bit frequency histogram is one, that the digital signal stream includes FSK modulated signals if a number of frequency spikes in the bit frequency histogram is greater than one, and that a PSK/FSK determination cannot be made if a number of frequency spikes is not determinable; and
wherein the detection circuitry is further configured to output PSK/FSK determination signals representing the PSK/FSK determination.

12. The receiver system of claim 11, wherein the detection circuitry is further configured to apply a Fourier transform to each bit segment to determine the frequency ($f_{max}$) at which the maximum signal energy occurs within the bit segment.

13. The receiver system of claim 12, wherein the detection circuitry is further configured to utilize an array and to add a peak value to the array at an index equal to the maximum frequency ($f_{max}$) for each bit segment to form the bit frequency histogram.

14. The receiver system of claim 11, wherein the detection circuitry is further configured to estimate a carrier frequency; analyze a bit phase for a plurality of bit segments within the digital signal stream to determine for a each bit segment a phase shift relative to the estimated carrier frequency, and to combine the phase shifts to generate a bit phase histogram for the bit phase of the plurality of bit segments;
wherein the detection circuitry is further configured to determine that the digital signal stream includes FSK modulated signals if no phase spikes occur in the bit phase histogram, that the digital signal stream includes PSK modulated signals if phase spikes occur in the bit phase histogram, and that a PSK/FSK determination cannot be made if a number of phase spikes is not determinable; and
wherein the detection circuitry is further configured to output PSK/FSK determination signals representing the PSK/FSK determination relating to the bit phase histogram.

15. The receiver system of claim 14, wherein the detection circuitry is further configured to a frequency spike from the bit frequency histogram as an estimated carrier frequency.

16. The receiver system of claim 14, wherein the detection circuitry is further configured to unwrap the bit phase histogram to generate a bit phase array representing bit phase correlation values, to apply a Fourier transform to the bit phase array; to utilize a most common minimum interval between bit phase correlation values in the Fourier transform as a prevalent repetition interval and to use the prevalent repetition interval to determine an appropriate estimation for the PSK phases.

17. The receiver system of claim 16, further comprising additional signal processing circuitry configured to apply a Radon transform to determine if a PSK signal is using non-standard phase states.

18. The receiver system of claim 11, further comprising an antenna configured to receive the analog signal stream and to provide the analog signal stream to the receive path circuitry.

19. The receiver system of claim 18, wherein the analog signal stream includes signals generated from one or more radio frequency (RF) systems that are unknown signal sources.

20. The receiver system of claim 19, wherein the one or more RF systems includes a PSK-based system or a FSK-based system.

* * * * *